United States Patent
Yamada et al.

(10) Patent No.: US 9,070,953 B2
(45) Date of Patent: Jun. 30, 2015

(54) ZINC-AIR SECONDARY BATTERY HAVING INORGANIC SOLID ELECTROLYTE BODY

(71) Applicant: NGK Insulators, Ltd., Nagoya-Shi (JP)

(72) Inventors: Naohito Yamada, Nagoya (JP); Kazuhiro Yamamoto, Nagoya (JP); Takahiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/258,431

(22) Filed: Apr. 22, 2014

(65) Prior Publication Data
US 2014/0227616 A1 Aug. 14, 2014

Related U.S. Application Data

(63) Continuation of application No. PCT/JP2012/074578, filed on Sep. 25, 2012.

(30) Foreign Application Priority Data

Nov. 16, 2011 (JP) .................................. 2011-250674

(51) Int. Cl.
*H01M 4/42* (2006.01)
*H01M 10/0562* (2010.01)
*H01M 12/08* (2006.01)

(52) U.S. Cl.
CPC ................ *H01M 12/08* (2013.01); *H01M 4/42* (2013.01); *H01M 2300/0014* (2013.01); *H01M 2300/0068* (2013.01); *H01M 2300/0094* (2013.01)

(58) Field of Classification Search
CPC ....... H01M 4/42; H01M 12/00; H01M 12/04; H01M 12/08; H01M 12/085; H01M 2300/0014; H01M 2300/0068; H01M 2300/0094

USPC .......................................... 429/406
See application file for complete search history.

(56) References Cited

U.S. PATENT DOCUMENTS 5,824,434 A * 10/1998 Kawakami et al. ........... 429/209
2009/0068531 A1 3/2009 Sawa et al.
2010/0323249 A1 12/2010 Fujiwara et al.

FOREIGN PATENT DOCUMENTS

EP 2 750 225 A1 7/2014
JP 05-007858 A1 1/1993

(Continued)

OTHER PUBLICATIONS

Inoue et al., Machine translation of JP 2007-227032 A, Sep. 2007.*
Sakata, J., Machine translation of JP 2009-093983 A, Apr. 2009.*
International Search Report (Application No. PCT/JP2012/074578) dated Dec. 18, 2012 (with English Translation).

(Continued)

*Primary Examiner* — Sean P Cullen
(74) *Attorney, Agent, or Firm* — Burr & Brown, PLLC

(57) ABSTRACT

Provided is a zinc-air secondary battery capable of preventing both of the short-circuiting between positive and negative electrodes caused by zinc dendrites and the carbon dioxide incorporation. This zinc-air secondary battery includes an air electrode (12) functioning as a positive electrode; an inorganic solid electrolyte body (14) provided in direct contact with one side of the air electrode and having hydroxide ion conductivity; a metal negative electrode (16) provided opposite to the air electrode with respect to the inorganic solid electrolyte body and comprising zinc or a zinc alloy; and an electrolyte solution in which the metal negative electrode is immersed, the electrolyte solution being separated from the air electrode by the inorganic solid electrolyte body.

15 Claims, 1 Drawing Sheet

(56) References Cited

FOREIGN PATENT DOCUMENTS

| | | | |
|---|---|---|---|
| JP | 2007227032 A * | 9/2007 | |
| JP | 2009-016090 A1 | 1/2009 | |
| JP | 2009-093983 A1 | 4/2009 | |
| WO | 2009/104570 A1 | 8/2009 | |
| WO | 2010/109670 A1 | 9/2010 | |
| WO | 2011/068217 A1 | 6/2011 | |

OTHER PUBLICATIONS

International Preliminary Report on Patentability (Application No. PCT/JP2012/074578) dated May 20, 2014 (with English translation).

European Office Action, European Patent Application No. 12849586, dated Nov. 17, 2014 (6 pages).

* cited by examiner

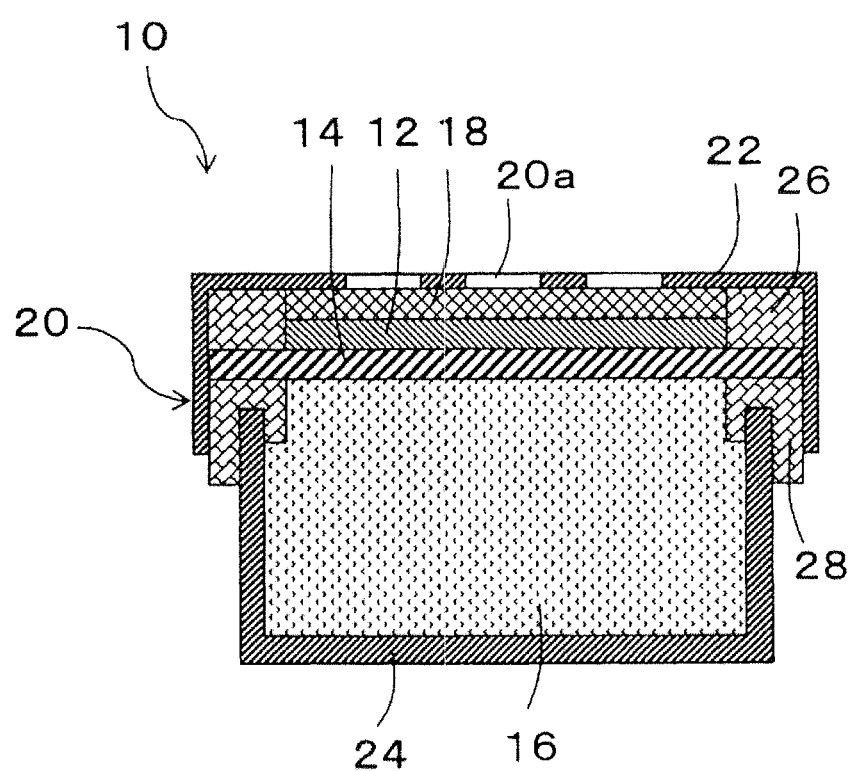

ZINC-AIR SECONDARY BATTERY HAVING INORGANIC SOLID ELECTROLYTE BODY

CROSS-REFERENCE TO RELATED APPLICATIONS

This application is a continuation application of PCT/JP2012/074578 filed on Sep. 25, 2012 and claims priority to Japanese Patent Application No. 2011-250674 filed on Nov. 16, 2011, the entire disclosures of which are incorporated herein by reference.

BACKGROUND OF THE INVENTION

1. Field of the Invention

The present invention relates to a zinc-air secondary battery.

2. Description of the Related Art

One of the promising candidates for an innovative battery is a metal-air battery. Since oxygen, which participates in cell reaction, is supplied from the air into the metal-air battery, the metal-air battery can make the best use of the space in a battery cell for packing a negative electrode active material, thus making it possible to achieve a high energy density in principle.

The majority of the metal-air batteries currently proposed is a lithium-air battery. However, the lithium-air battery has many technical problems, such as formation of undesired reaction products on an air electrode, incorporation of carbon dioxide, and short-circuiting between positive and negative electrodes due to formation of lithium dendrites (dendritic crystals).

On the other hand, a zinc-air battery, in which zinc is used as a negative electrode active material, has also been known from the past. In particular, a zinc-air primary battery has already been mass-produced and widely used as a power source for a hearing aid or the like. The zinc-air battery uses, as an electrolyte solution, an alkaline aqueous solution such as potassium hydroxide, and uses a separator (partition) for preventing short-circuiting between positive and negative electrodes. During discharging, $O_2$ is reduced in the air electrode (positive electrode) to produce $OH^-$, while zinc is oxidized in the negative electrode to produce ZnO, as shown by the following reaction formulae:

Positive Electrode: $O_2+2H_2O+4e^- \rightarrow 4OH^-$ 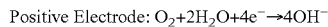

Negative Electrode: $2Zn+4OH^- \rightarrow 2ZnO+2H_2O+4e^-$ 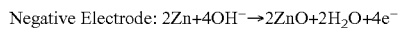

Although some attempts to use this zinc-air battery as a secondary battery have ever been made, there is a problem that deposition of zinc metal occurs as dendrites by reduction of ZnO during charging, which penetrate the separator to come into contact with a positive electrode, thus causing short-circuiting. This problem has been a big hindrance to practical application of the zinc-air battery as a secondary battery.

Moreover, there was also a problem that carbon dioxide in the air permeates through the air electrode and dissolves in an electrolyte solution to produce alkaline carbonate, thus degrading a battery performance. To deal with this problem, there has been made an attempt to provide the inside of the air electrode with an anion exchange membrane, through which hydroxide ions generated in the air electrode permeate and by which cations, such as an alkaline metal ion (e.g., $K^+$) and a negative electrode metal ion (e.g., $Zn^{2+}$) in an alkaline electrolyte solution, are prevented from permeating the air electrode side, so as to suppress precipitation of carbonate ($K_2CO_3$) and metal oxide (ZnO), which are otherwise produced in the air electrode by a chemical reaction with carbon dioxide in the air (see e.g., Patent Document 1 (WO2009/104570)). However, the anion exchange membrane is made of resin, and thus has a problem that zinc dendrites, which are formed on the negative electrode during charging, penetrate the anion exchange membrane to come into contact with the air electrode, so that short-circuiting may occur between the positive and negative electrodes.

In order to suppress the formation of dendrites in a secondary battery, an attempt to allow an electrolyte solution to contain a dendrite formation inhibitor has also been proposed (see e.g., Patent Document 2 (JP2009-93983A)). However, such an attempt does not address the problem of carbon dioxide incorporation.

The zinc-air battery has less problems with reaction than the lithium-air battery. Thus, it is said that if the problems with short-circuiting between the positive and negative electrodes caused by zinc dendrites and carbon dioxide incorporation are solved, the zinc-air battery would be highly feasible as a high capacity secondary battery. Therefore, in the zinc-air secondary battery, a technique for preventing both of the short-circuiting caused by zinc dendrites and the carbon dioxide incorporation is highly desired.

In the meantime, as a solid electrolyte having hydroxide ion conductivity, layered double hydroxides (LDH) represented by the general formula: $M^{2+}_{1-x}M^{3+}_x(OH)_2$ $A^{n-}_{x/n} \cdot mH_2O$ (wherein $M^{2+}$ is a bivalent cation, $M^{3+}$ is a trivalent cation, and $A^{n-}$ is an n-valent anion) have been recently known, and the use of a membrane of the layered double hydroxides as an alkaline electrolyte membrane of a direct alcohol fuel cell has been proposed (see e.g., Patent Document 3 (WO2010/109670)).

CITATION LIST

Patent Documents

Patent Document 1: WO2009/104570
Patent Document 2: JP2009-93983A
Patent Document 3: WO2010/109670

SUMMARY OF THE INVENTION

The inventors have currently found that, in the zinc-air battery, using as a separator an inorganic solid electrolyte body having hydroxide ion conductivity and providing the inorganic solid electrolyte body in direct contact with one side of the air electrode make it possible to prevent both of the short-circuiting between positive and negative electrodes caused by zinc dendrites during charging and the carbon dioxide incorporation into an electrolyte solution, and thereby to make the zinc-air battery usable as a highly reliable secondary battery.

Therefore, an object of the present invention is to provide a zinc-air secondary battery capable of preventing both of the short-circuiting between positive and negative electrodes caused by zinc dendrites and the carbon dioxide incorporation.

According to an aspect of the present invention, there is provided a zinc-air secondary battery comprising:

an air electrode functioning as a positive electrode;

an inorganic solid electrolyte body provided in direct contact with one side of the air electrode, the inorganic solid electrolyte body having hydroxide ion conductivity;

a metal negative electrode provided opposite to the air electrode with respect to the inorganic solid electrolyte body, the metal negative electrode comprising zinc or a zinc alloy; and an electrolyte solution in which the metal negative electrode is immersed, the electrolyte solution being separated from the air electrode by the inorganic solid electrolyte body.

BRIEF DESCRIPTION OF THE DRAWINGS

The FIGURE is a schematic cross sectional view showing an example of a zinc-air secondary battery according to the present invention.

DETAILED DESCRIPTION OF THE INVENTION

Hereinafter, descriptions will be made on the zinc-air secondary battery according to one aspect of the present invention with reference to the accompanying drawings.

Zinc-Air Secondary Battery

The FIGURE shows an example of the zinc-air secondary battery of the present invention. The zinc-air secondary battery 10 shown in the FIGURE includes an air electrode 12 functioning as a positive electrode, an inorganic solid electrolyte body 14, a metal negative electrode 16, and an electrolyte solution. The inorganic solid electrolyte body 14, which has hydroxide ion conductivity, is provided in direct contact with one side of the air electrode 12. The metal negative electrode 16, which contains zinc or a zinc alloy, is provided opposite to the air electrode 12 with respect to the inorganic solid electrolyte body 14. The electrolyte solution, in which the metal negative electrode 16 is immersed, is separated from the air electrode 12 by the inorganic solid electrolyte body 14.

Thus, the zinc-air secondary battery 10 of the present invention has a structure where the inorganic solid electrolyte body 14 having hydroxide ion conductivity is used as a separator, and the inorganic solid electrolyte body 14 is provided in direct contact with one side of the air electrode 12. The use of the inorganic solid electrolyte body 14 having hydroxide ion conductivity as the separator, makes it possible to prevent permeation of carbon dioxide coming from the air electrode, as with the anion exchange membrane disclosed in Patent Document 1. Further, the inorganic solid electrolyte body 14 is typically made of a dense and hard inorganic solid, which physically prevents zinc dendrites, which are produced during charging, from breaking through the separator, thus making it also possible to prevent short-circuiting between the positive and negative electrodes. In this way, it is possible to prevent both of the short-circuiting between positive and negative electrodes caused by zinc dendrites and the carbon dioxide incorporation, and thereby to make the zinc-air battery usable as a secondary battery.

In the meantime, a reaction between the positive electrode (air electrode) and the negative electrode (zinc electrode) taken place during discharging of the zinc-air battery proceeds as follows:

Positive Electrode: $O_2 + 2H_2O + 4e^- \rightarrow 4OH^-$ 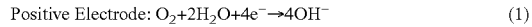 (1)

Negative Electrode: $2Zn + 4OH^- \rightarrow 2ZnO + 2H_2O + 4e$ 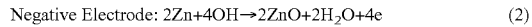 (2)

The conventional zinc-air battery is filled with an electrolyte solution as an alkaline aqueous solution between an air electrode and a zinc negative electrode, and is provided with an insulating porous separator to prevent direct short-circuiting between the air electrode and the zinc negative electrode. In this case, since the electrolyte solution comes and goes through the separator to come into contact with the air electrode, the positive electrode reaction (1) will occur in a three-phase interface formed by the electrolyte solution, the air electrode (catalyst), and the air. Therefore, $H_2O$ appearing in the positive electrode reaction formula (1) is taken in from the electrolyte solution. In contrast, since in the zinc-air secondary battery 10 of the present invention, the inorganic solid battery body 14 is provided in direct contact with one side of the air electrode 12, the electrolyte solution exists only in the metal negative electrode 16 side with respect to the inorganic solid battery body 14, and does not exist in the air electrode 12 side. This makes it possible to prevent carbon dioxide in the air from being taken into the electrolyte solution to precipitate reaction products. In this case, while it is impossible to source $H_2O$, which is indispensable for the positive electrode reaction (1), from the electrolyte solution, the battery of the present invention makes use of the moisture in the air as $H_2O$, which is used in the positive electrode reaction (1). Accordingly, it is preferable that the battery of the present invention be used in the presence of a humidified air in order to attain an effective battery operation.

Inorganic Solid Electrolyte Body

The inorganic solid electrolyte body 14 includes an inorganic solid electrolyte having hydroxide ion conductivity, with which any member that can function as the separator is usable. Since the inorganic solid electrolyte is typically made of a dense and hard inorganic solid, the inorganic solid electrolyte can prevent both the short-circuiting between positive and negative electrodes caused by zinc dendrites and the carbon dioxide incorporation to the electrolyte solution. The inorganic solid electrolyte body has preferably a relative density of 90% or more, more preferably 92% or more, most preferably 95% or more, as calculated by Archimedes method, but not limited thereto as far as the inorganic solid electrolyte body is dense and hard enough to prevent the penetration by zinc dendrites and the carbon dioxide incorporation. Such a dense and hard inorganic solid electrolyte body can be manufactured by hydrothermal solidification. Accordingly, a mere green compact, which did not undergo hydrothermal solidification, lacks denseness and is brittle in liquid solution, and thus is unfavorable for the inorganic solid electrolyte body of the present invention. Nonetheless, even without relying upon hydrothermal solidification, any solidification technique can be adopted as long as a dense and hard inorganic electrolyte body can be obtained.

The inorganic solid electrolyte body 14 may be a composite composed of particles made of an inorganic solid electrolyte having hydroxide ion conductivity and an auxiliary component facilitating densification and hardening of these particles. Alternatively, the inorganic solid electrolyte body 14 may be a composite composed of a porous body having open pores serving as a substrate and an inorganic solid electrolyte (e.g., layered double hydroxides) precipitated and grown in the pores so as to fill the pores of the porous body. Examples of materials composing the porous body include ceramics such as alumina and zirconia and insulating materials such as a porous sheet made of a foamed resin or a fibrous material.

It is preferable that the inorganic solid electrolyte body 14 is composed of a layered double hydroxide (LDH) having a basic composition represented by the general formula:

$$M^{2+}_{1-x}M^{3+}_x(OH)_2A^{n-}_{x/n} \cdot mH_2O$$ 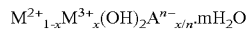

(wherein, $M^{2+}$ is a divalent cation, $M^{3+}$ is a trivalent cation, $A^{n-}$ is an n-valent anion, n is an integer of 1 or more, x is from 0.1 to 0.4, and m is any integer denoting mol number of water). Examples of $M^{2+}$ include $Mg^{2+}$, $Ca^{2+}$, $Sr^{2+}$, $Ni^{2+}$, $Co^{2+}$, $Fe^{2+}$, $Mn^{2+}$, and $Zn^{2+}$. Examples of $M^{3+}$ include $Al^{3+}$, $Fe^{3+}$, $Ti^{3+}$, $Y^{3+}$, $Ce^{3+}$, $Mo^{3+}$, and $Cr^{3+}$. Examples of $A^{n-}$ include $CO_3^{2-}$ and $OH^{31}$. For each of $M^{2+}$ and $M^{3+}$, one single kind of cation may be used, or two or more kinds of cations may also be used in combination. In particular, an Mg—Al type LDH in which $M^{2+}$ is $Mg^{2+}$, $M^{3+}$ is $Al^{3+}$, and $A^{n-}$ is $CO_3^{2-}$, is preferable. This compound is disclosed in Patent Document 3 (WO2010/109670), as having $OH^-$ ion conductivity and being applicable as an alkaline electrolyte membrane for a direct alcohol fuel cell. However, the alkaline electrolyte membrane disclosed in Patent Document 3 is a membrane obtained by merely packing a powder of the Mg—Al type layered double hydroxide by cold press or the like, failing to provide strong bonding among the powder particles. It is understood that such a technique has ever been adopted since the hydroxide powder cannot be integrally densified by sintering as adopted for so-called oxide ceramics.

Therefore, in order to make the inorganic solid electrolyte body 14 usable in the present invention, it is preferable to conduct hydrothermal solidification so as to densify a pellet obtained by packing a base powder by pressure. This technique is extremely effective for integral densification of the layered double hydroxides, especially for the Mg—Al type layered double hydroxides. The hydrothermal solidification may be conducted at a temperature of 120 to 250° C. for 2 to 24 hours, after putting pure water and a plate-shaped green compact into a pressure vessel.

The shape of the inorganic solid electrolyte body 14 is not particularly limited, and may be either a dense plate shape or a film shape. Nevertheless, the plate-shaped inorganic solid electrolyte body is preferable in that it can effectively prevent the penetration by zinc dendrites. The thickness of the plate-shaped inorganic solid electrolyte body is preferably from 0.01 to 0.5 mm, more preferably from 0.02 to 0.2 mm, and most preferably from 0.05 to 1 mm. Further, a higher hydroxide ion conductivity of the inorganic solid electrolyte body is more desirable, but typically the body has a conductivity of from $10^{-4}$ to $10^{-1}$ S/m.

Air Electrode

The air electrode 12 is not particularly limited as long as the electrode functions as a positive electrode in the zinc-air battery. A variety of air electrodes in which oxide can be used as a positive electrode active material may be used. Preferable examples of the air electrode 12 include catalyst materials, which include carbon based materials having redox catalytic property such as graphite; metals having redox catalytic property such as platinum and nickel; and inorganic oxides having redox catalytic property such as perovskite type oxide, manganese dioxide, nickel oxide, cobalt oxide, and spinel oxide.

It is preferable that the air electrode 12 is a porous carbon material supporting a catalyst having redox catalytic property. In this case, it is particularly preferable to form the air electrode by applying a paste of a catalyst material as described above to the air electrode side of a hydroxide-ion-conductive solid electrolyte plate composed of an Mg—Al type LDH.

Moreover, the air electrode 12 may be a porous material composed of inorganic oxide fine particles having redox catalytic property, for which it is preferable that the inorganic solid electrolyte body is formed in a film shape on one side of the porous material. In this case, it is particularly preferable that powder particles of the perovskite type oxide are sintered to form a porous body, to one side of which a film of an Mg—Al type LDH is densely prepared by hydrothermal method or the like to form a laminate structure of the air electrode and the inorganic solid electrolyte body.

The air electrode 12 may contain an electrically conductive material. The conductive material is not particularly limited, but preferable examples thereof include carbon blacks such as ketjen black, acetylene black, channel black, furnace black, lamp black, and thermal black; graphites such as natural graphite like flaky graphite, artificial graphite, and expanded graphite; conductive fibers such as a carbon fiber and a metallic fiber; metal powders such as copper, silver, nickel, and aluminum; organic conductive materials such as polyphenylene derivatives; and any mixtures thereof.

The air electrode 12 may contain a binder. The binder may be a thermoplastic resin or a thermosetting resin, and is not particularly limited. Preferable examples of the binder include polyethylene, polypropylene, polytetrafluoroethylene (PTFE), polyvinylidene fluoride (PVDF), styrene-butadiene rubber, tetrafluoroethylene-hexafluoroethylene copolymer, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer, and any mixtures thereof.

The air electrode 12 may be provided with a positive electrode current collector 18 on the surface opposite to the inorganic solid electrolyte body 14. In this case, it is preferable that the positive electrode current collector 18 has air permeability so as to allow air to be supplied to the air electrode 12. Preferable examples of the current collector include metal plates or metal meshes of stainless steel, copper, nickel or the like, a carbon paper, and an oxide conductor, among which a stainless steel mesh is particularly preferred from the viewpoint of corrosion resistance and air permeability.

Metal Negative Electrode

The metal negative electrode 16 contains zinc or a zinc alloy functioning as a negative electrode active material. The metal negative electrode 16 may be in any form or shape such as particulate, plate, and gel, but it is preferable to be in particulate or gel form from the viewpoint of reaction rate. A particulate metal negative electrode having a particle diameter of 30 to 350 μm may preferably be used. A gel-form metal negative electrode obtained by mixing and agitating a mercury-free zinc alloy powder having a particle diameter of 100 to 300 μm, an alkaline electrolyte, and a thickener (gelling agent) to form a gel may also be used preferably.

The zinc alloy may be amalgamated or mercury-free alloys with magnesium, aluminum, lithium, bismuth, indium, lead, or the like. The amount of the zinc alloy is not particularly limited as long as the alloy can ensure a desired performance as the negative electrode active material. Preferable zinc alloy is a mercury-free zinc alloy without mercury and lead, and those containing aluminum, bismuth, indium, or a combination thereof are more preferred. Further preferred is a mercury-free zinc alloy containing bismuth of from 50 to 1000 ppm, indium of from 100 to 1000 ppm, aluminum and/or calcium of from 10 to 100 ppm, particularly preferably bismuth of from 100 to 500 ppm, indium of from 300 to 700 ppm, aluminum and/or calcium of from 20 to 50 ppm.

The metal negative electrode 16 may be supported on the negative electrode current collector. Preferable examples of the negative electrode current collector include metal plates or metal meshes of stainless steel, copper, nickel or the like, a carbon paper, an oxide conductor, and the like.

Electrolyte Solution

A variety of electrolyte solutions generally used for the zinc-air battery can be used as the electrolyte solution. Examples of the electrolyte solution include alkaline metal hydroxide aqueous solutions such as a potassium hydroxide aqueous solution and a sodium hydroxide aqueous solution; solutions containing zinc chloride or zinc perchlorate; non-aqueous solvents containing zinc perchlorate; and nonaqueous solvents containing zinc bis(trifluoromethylsulfonyl)imide. Among them, the alkaline metal hydroxide aqueous solution, especially the potassium hydroxide solution is preferable, a potassium hydroxide aqueous solution containing potassium hydroxide of from 30 to 45 percent by weight being more preferable.

Battery Cell

The air electrode 12, the inorganic solid electrolyte body 14, the metal negative electrode 16, and the electrolyte solution may be housed in the battery cell 20. It is preferable that the battery cell 20 has an air hole 20a to allow the air electrode 12 to be in contact with the outside air. Material, shape, and structure of the battery cell are not particularly limited, but it is desirable to constitute the battery cell so as to prevent incorporation of air (especially, carbon dioxide) into the electrolyte solution and leakage of the electrolyte solution.

The battery cell 20 shown in the FIGURE includes a positive electrode case 22 housing at least the air electrode 12, and a negative electrode case 24 housing at least the metal negative electrode 16 and the electrolyte solution. The positive electrode case 22 is provided with the air hole 20a, which allows the air passed through the positive electrode current collector 18 to reach the air electrode 12. The positive electrode case 22 is fitted to the negative electrode case 24 through the positive electrode gasket 26 and the negative electrode gasket 28 to ensure airtightness in the battery cell 20. Specifically, the positive electrode gasket 26 is provided along the inner periphery of the positive electrode case 22, and the air electrode 12 and the positive electrode current collector 18 are provided inside the positive electrode gasket 26 so that the total thickness thereof can be the same as the thickness of the positive electrode gasket 26. The negative electrode gasket 28 is provided on the upper edges of the metal negative electrode 16 and the negative electrode case 24 filled with an electrolyte solution. The positive electrode case 22 is designed to have an internal diameter larger than the internal diameter of the negative electrode case 24. Therefore, the zinc-air battery cell has a structure in which the positive electrode case 22 provided with the positive electrode gasket 26 is put on the negative electrode case 24 provided with the negative electrode gasket 28 so that the inorganic solid electrolyte body 14 is sandwiched between the positive electrode gasket 26 and the negative electrode gasket 28. Material, shape, and structure of the positive electrode gasket 26 and the negative electrode gasket 28 are not particularly limited as long as they can ensure airtightness and watertightness, but the positive electrode gasket 26 and the negative electrode gasket 28 are preferred to be made of a material having insulation properties such as nylon. This battery cell 20 can securely prevent air components (especially, carbon dioxide) from infiltrating the electrolyte solution in the negative electrode case 24, by means of the inorganic solid electrolyte body 14 and the positive electrode gasket 26 and the negative electrode gasket 28. The procedure of fitting the positive electrode case 22 and the negative electrode case 24 is not particularly limited. The negative electrode gasket 28, the inorganic solid electrolyte body 14, the air electrode 12, the positive electrode current collector 18, and the positive electrode gasket 26 may be appropriately arranged in order on the metal negative electrode 16 and the negative electrode case 24 filled with the electrolyte solution, and the positive electrode case 22 may lastly be put thereon. Alternatively, the positive electrode case 22 in which the air electrode 12, the positive electrode current collector 18, and the positive electrode gasket 26 are assembled may be prepared in advance, and then may be fitted to the negative electrode case 24, which is filled with the metal negative electrode 16 and the electrolyte solution and is provided with the negative electrode gasket 28, so that the inorganic solid electrolyte body 14 may be sandwiched therebetween.

The zinc-air secondary battery of the present invention may be in any shape, such as coin, button, sheet, layered, cylindrical, flat, and square. Further, the zinc-air secondary battery is applicable not only to a small-sized secondary battery but also to a large-sized secondary battery for use in an electric vehicle and the like.

EXAMPLES

Examples of manufacture of the zinc-air secondary battery of the present invention will be given below.

Example 1

Preparation of Inorganic Solid Electrolyte Body by Hydrothermal Solidification

A mixed aqueous solution containing $Mg(NO_3)_2$ and $Al(NO_3)_3$ at a Mg/Al mole ratio of 3/1 was prepared. This mixed aqueous solution was added drop by drop to a $Na_2CO_3$ aqueous solution to obtain precipitates. At this time, the pH of the aqueous solution was controlled to be constant at about 10 by adding a sodium hydroxide solution to the aqueous solution. The resulting precipitates were filtered, washed and dried to obtain a layered double hydroxide powder of which the average primary particle diameter was 0.5 μm or less and the average secondary particle diameter was 5 μm or less. This layered double hydroxide powder was pressed by uniaxial pressing to produce a plate-shaped green compact. A pure water and the plate-shaped green compact were put into a pressure vessel and were heated at 150° C. for four hours to obtain a plate-shaped inorganic solid electrolyte body. The relative density of the resulting plate-shaped inorganic solid electrolyte body was measured by Archimedes method and found to be 95%.

Example 2

Preparation of Zinc-Air Secondary Battery

The plate-shaped inorganic solid electrolyte body obtained in Example 1 is used to assemble the zinc-air secondary battery 10 as shown in the FIGURE. Firstly, a circular negative electrode case 24 made of stainless steel is prepared. An insulating negative electrode gasket 28 made of nylon is provided on the upper edge of the negative electrode case 24, and thereafter the particulate zinc electrode 16 is housed in the negative electrode case 24. The negative electrode case 24 is filled with a 6N potassium hydroxide aqueous solution as an electrolyte solution. The inorganic solid electrolyte body 14 is provided in contact with the negative electrode gasket 28 so that the zinc negative electrode 16 and the electrolyte solution can be sealed in the negative electrode case 24. An air electrode 12 composed of a platinum-supported carbon and a positive electrode current collector 18 composed of a stainless wire mesh are layered in this order on the inorganic solid electrolyte body 14. An insulating positive electrode gasket 26 made of nylon is provided on the inorganic solid electrolyte body 14 along the outer edges of the air electrode 12 and the positive electrode current collector 18. The resulting assembly is covered with a stainless steel positive electrode case 22 having air holes 20a, and then is pressed so that the air electrode 12 and the negative electrode 16 are securely sealed up in the battery cell 20 by means of the positive electrode gasket 26 and the negative electrode gasket 28. Thus, the zinc-air secondary battery 10 shown in the FIGURE is obtained.

What is claimed is:

1. A zinc-air secondary battery comprising:
    an air electrode functioning as a positive electrode;
    an inorganic solid electrolyte body provided in direct contact with one side of the air electrode, the inorganic solid electrolyte body having hydroxide ion conductivity;
    a metal negative electrode provided opposite to the air electrode with respect to the inorganic solid electrolyte body, the metal negative electrode comprising zinc or a zinc alloy; and
    an electrolyte solution in which the metal negative electrode is immersed, the electrolyte solution being separated from the air electrode by the inorganic solid electrolyte body,
    wherein the inorganic solid electrolyte body prevents carbon dioxide from the air from contacting the electrolyte solution.

2. The zinc-air secondary battery according to claim 1, wherein the inorganic solid electrolyte body has a relative density of 90% or more.

3. The zinc-air secondary battery according to claim 1, wherein the inorganic solid electrolyte body is densified by hydrothermal solidification method.

4. The zinc-air secondary battery according to claim 1, wherein the inorganic solid electrolyte body is impermeable to carbon dioxide.

5. The zinc-air secondary battery according to claim 1, wherein the inorganic solid electrolyte body is formed in a plate shape.

6. The zinc-air secondary battery according to claim 1, wherein the metal negative electrode is composed of particles made of the zinc or the zinc alloy.

7. The zinc-air secondary battery according to claim 1, wherein the Electrolyte solution is an alkaline metal hydroxide aqueous solution.

8. The zinc-air secondary battery according to claim 1, wherein the air electrode is a porous carbon material supporting a catalyst having redox catalytic property.

9. The zinc-air secondary battery according to claim 1, wherein the air electrode is a porous material composed of inorganic oxide fine particles having redox catalytic property, wherein the inorganic solid electrolyte body is formed in a film shape on the one side of the air electrode.

10. The zinc-air secondary battery according to claim 1, wherein the inorganic solid electrolyte body is composed of a layered double hydroxide having a basic composition represented by the general formula:

$$M^{2+}_{1-x}M^{3+}_{x}(OH)_2A^{n-}_{x/n}\cdot mH_2O$$

wherein, $M^{2+}$ is a bivalent cation, $M^{3+}$ is a trivalent cation, and $A^{n-}$ is an n-valent anion, m in any integer denoting mol number of water, n is an integer of 1 or more, x is from 0.1 to 0.4.

11. The zinc-air secondary battery according to claim 10, wherein $M^{2+}$ is $Mg^{2+}$, $M^{3+}$ is $Al^{3+}$, and $A^{n-}$ is $CO_3^{2-}$.

12. The zinc-air secondary battery according to claim 1, further comprising a battery cell which has an air hole for allowing the air electrode to be in contact with an outside air and houses the air electrode, the inorganic solid electrolyte body, the metal negative electrode, and the electrolyte solution.

13. The zinc-air secondary battery according to claim 12, further comprising a current collector having air permeability provided between the battery cell and the air electrode.

14. The zinc-air secondary battery according to claim 12, wherein the battery cell comprises:
    a positive electrode case having the air hole and housing at least the air electrode; and
    a negative electrode case fitted to the positive electrode case and housing at Least the metal negative electrode and the electrolyte solution.

15. The zinc-air secondary battery according to claim 14, wherein the positive electrode case and the negative electrode case are fitted to each other through at least one gasket.

* * * * *